(12) United States Patent
Raikar et al.

(10) Patent No.: US 11,021,128 B2
(45) Date of Patent: Jun. 1, 2021

(54) DEPLOYABLE ROOF CONTAINMENT SYSTEM AND METHOD

(71) Applicant: GM GLOBAL TECHNOLOGY OPERATIONS LLC, Detroit, MI (US)

(72) Inventors: Sadanand N. Raikar, Jayanagar (IN); Jeffrey J. Schultz, Grand Blanc, MI (US); Jeffrey W. Ronne, Shelby Township, MI (US); Stephen J. Cassatta, Wixom, MI (US); Louis S. Campbell, Waterford, MI (US); Mukesh Amin, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/534,077

(22) Filed: Aug. 7, 2019

(65) Prior Publication Data

US 2019/0359162 A1 Nov. 28, 2019

Related U.S. Application Data

(62) Division of application No. 15/813,589, filed on Nov. 15, 2017, now Pat. No. 10,427,637.

(51) Int. Cl.
| | |
|---|---|
| *B60R 21/214* | (2011.01) |
| *B60R 21/0132* | (2006.01) |
| *B60R 21/264* | (2006.01) |
| *B60R 21/013* | (2006.01) |
| *B60J 7/02* | (2006.01) |
| *B60R 21/00* | (2006.01) |
| *B60R 21/231* | (2011.01) |
| *B60R 21/01* | (2006.01) |

(52) U.S. Cl.
CPC .............. *B60R 21/214* (2013.01); *B60J 7/02* (2013.01); *B60R 21/013* (2013.01); *B60R 21/0132* (2013.01); *B60R 21/264* (2013.01); *B60R 2021/0018* (2013.01); *B60R 2021/01204* (2013.01); *B60R 2021/23192* (2013.01)

(58) Field of Classification Search
CPC . B60R 21/214; B60R 21/0132; B60R 21/264; B60R 21/013; B60R 2021/01207; B60R 2021/0018; B60R 2021/23192; B60J 7/02; B60J 7/0023; B60J 7/0015
See application file for complete search history.

(56) References Cited

U.S. PATENT DOCUMENTS

| | | | |
|---|---|---|---|
| 3,804,435 A * | 4/1974 | See ....................... | B60R 21/131 280/733 |
| 6,520,572 B1 * | 2/2003 | Niederman ................ | B60J 7/06 180/281 |

(Continued)

*Primary Examiner* — Karen Beck

(57) ABSTRACT

One general aspect includes a deployable containment system for a vehicle roof panel, the system including: a pair of guide channels proximate to an opening through the vehicle roof panel, each guide channel of the pair having a first end and a second end; a housing mounted to the first end of the pair of guide channels. The deployable containment system also includes a shield configured to deploy from the housing and travel along the pair of guide channels so as to cover at least a portion of the opening. The deployable containment system also includes an actuator disposed proximate to the pair of guide channels, the actuator configured to deploy the shield from the housing after a deployment event.

8 Claims, 14 Drawing Sheets

(56) References Cited

U.S. PATENT DOCUMENTS

| | | | |
|---|---|---|---|
| 10,427,637 B2 * | 10/2019 | Raikar | B60R 21/214 |
| 2002/0167202 A1 * | 11/2002 | Pfalzgraf | B60J 7/0015 |
| | | | 296/214 |
| 2009/0174174 A1 * | 7/2009 | McCoy | B60R 21/214 |
| | | | 280/749 |
| 2017/0267199 A1 * | 9/2017 | Schutt | B60R 21/13 |
| 2019/0359162 A1 * | 11/2019 | Raikar | B60R 21/16 |
| 2020/0139918 A1 * | 5/2020 | Koo | B60R 21/23138 |

\* cited by examiner

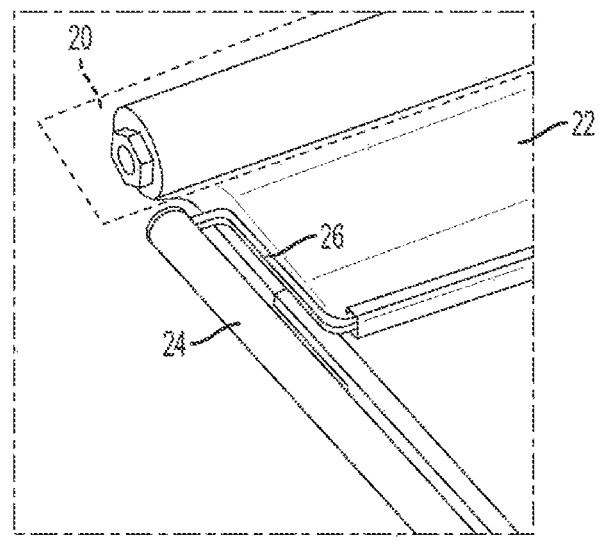
FIG. 5B
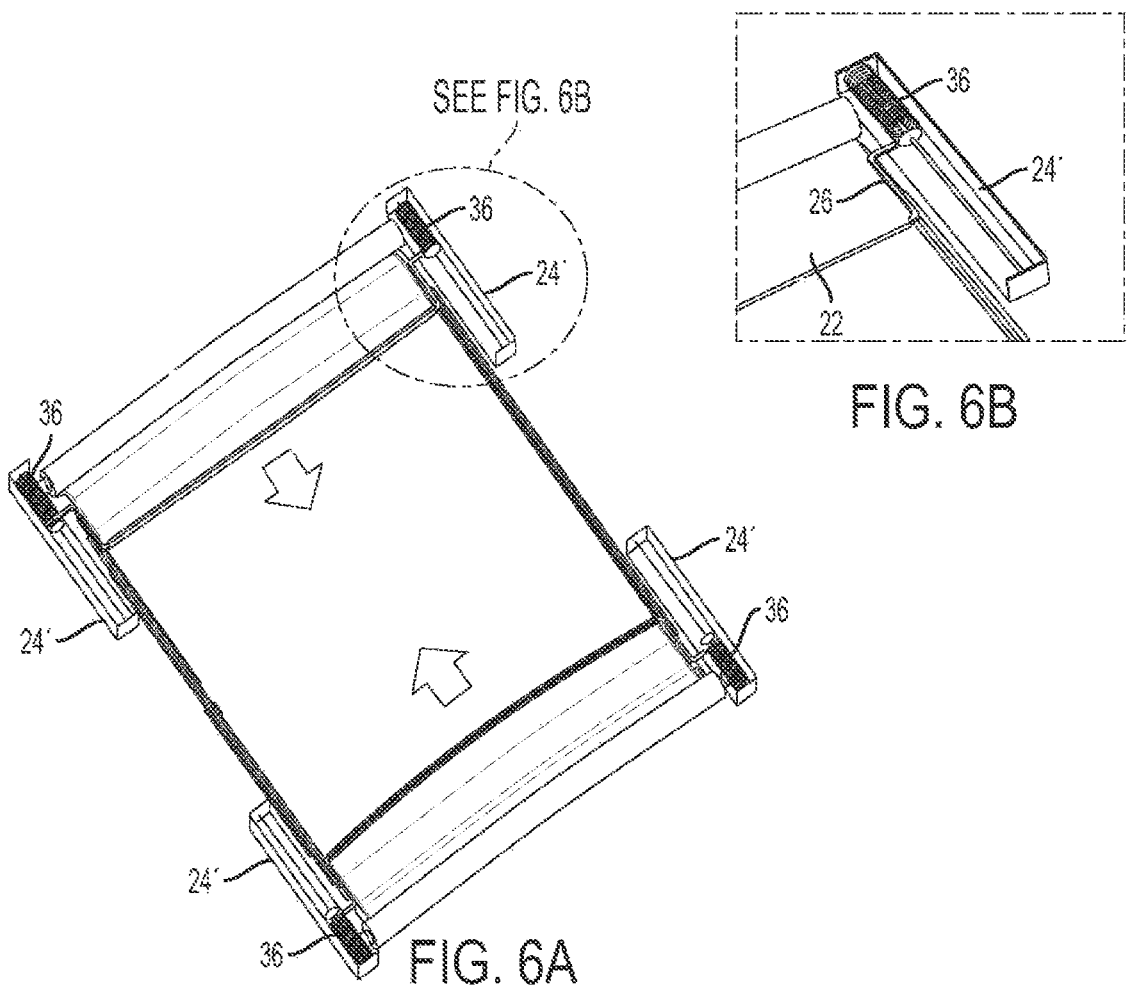
FIG. 6B
FIG. 6A

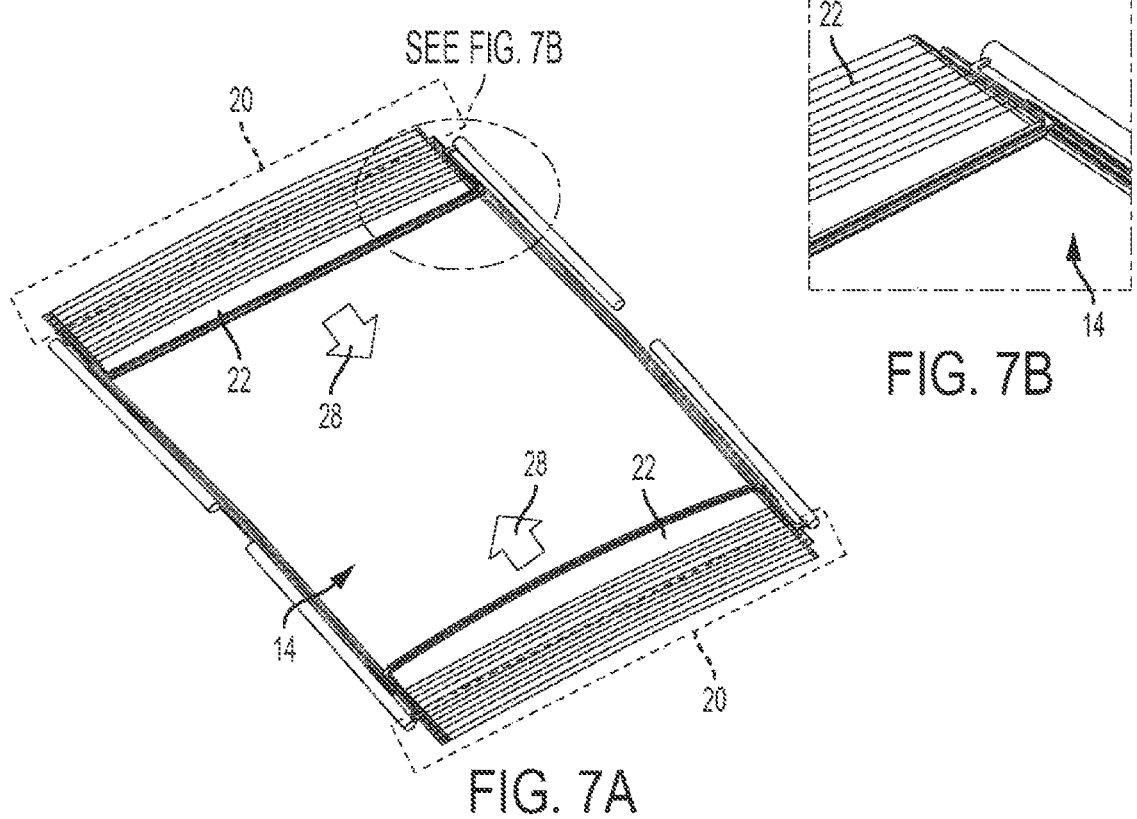
FIG. 7A
FIG. 7B
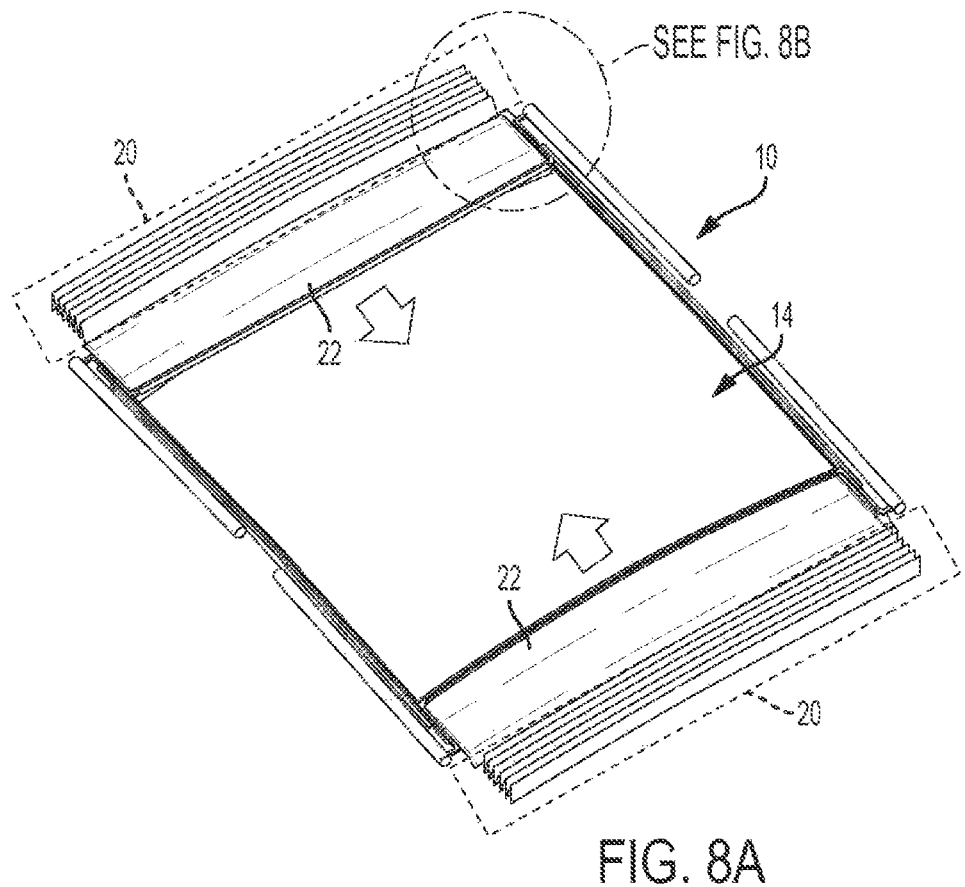
FIG. 8A

DEPLOYABLE ROOF CONTAINMENT SYSTEM AND METHOD

CROSS-REFERENCE TO RELATED APPLICATIONS

The present disclosure is a divisional of United States patent application Ser. No. 15/813,589 filed on Nov. 15, 2017 now U.S. Pat. No. 10,427,637.

INTRODUCTION

Vehicle rollover is caused by exceeding the critical roll angle for a particular vehicle. The roll angle being the function of the suspension of the vehicle, the vehicle's loading condition and other vehicle characteristics and dynamic conditions. Occupant ejection is a major cause of injury and death in rollover crashes. In NHTSA's field data analysis of rollover occupant ejection in support of FMVSS226, 47% of occupants fatally injured in rollovers were completely ejected from their vehicles. The analysis also found that avoiding complete ejection is associated with a 64% decrease in risk of fatality. Therefore, it is desirable to produce a system which will contain occupants within the vehicle interior when it rolls over.

SUMMARY

One general aspect includes a deployable containment system for a vehicle roof panel, the system including: a pair of guide channels proximate to an opening through the vehicle roof panel, each guide channel of the pair having a first end and a second end; a housing mounted to the first end of the pair of guide channels. The deployable containment system also includes a shield configured to deploy from the housing and travel along the pair of guide channels so as to cover at least a portion of the opening. The deployable containment system also includes an actuator disposed proximate to the pair of guide channels, the actuator configured to deploy the shield from the housing after a deployment event. Other embodiments of this aspect may include corresponding computer systems, apparatus, and computer programs recorded on one or more computer storage devices, each configured to perform the actions of the system.

Implementations may include one or more of the following features. The deployable containment system further includes one or more locking mechanisms configured to lock the shield after having traveled a distance along the pair of guide channels. The deployable containment system where one of the one or more locking mechanisms includes an inflatable tube, inflator device, and anchor point. The deployable containment system where the actuator includes a spring to deploy the shield from the housing. The deployable containment system where the actuator includes pyrotechnics to deploy the shield from the housing. The deployable containment system where the shield is wound into a roll shape around a winding shaft while in the housing and, upon deployment, the shield is drawn from the winding shaft to travel along the pair of guide channels so as to cover at least the portion of the opening. The deployable containment system where the deployment event is an indication that the vehicle rollover sensing system has predicted a rollover event.

One general aspect includes a deployable containment system for a vehicle roof panel, the system including: a pair of guide channels proximate to an opening through the vehicle roof panel, each guide channel of the pair having a first end and a second end; a first housing mounted to the first end of the pair of guide channels; a second housing mounted to the second end of the pair of guide channels. The deployable containment system also includes a first shield configured to deploy from the first housing and travel along the pair of guide channels so as to cover a first portion of the opening. The deployable containment system also includes a second shield configured to deploy from the second housing and travel along the pair of guide channels so as to cover a second portion of the opening. The deployable containment system also includes a first actuator disposed proximate to the first end of the pair of guide channels, the first actuator configured to deploy the first shield from the first housing after a deployment event. The deployable containment system also includes a second actuator disposed proximate to the second end of the pair of guide channels, the second actuator configured to deploy the second shield from the second housing after the deployment event. Other embodiments of this aspect may include corresponding computer systems, apparatus, and computer programs recorded on one or more computer storage devices, each configured to perform the actions of the methods.

Implementations may include one or more of the following features. The deployable containment system further includes one or more locking mechanisms configured to lock the first and second shields after each of the first and second shields has traveled a distance along the pair of guide channels. The deployable containment system where at least one of the one or more locking mechanisms includes an inflatable tube, inflator device, and anchor point. The deployable containment system further includes: a first scissor lever mechanism disposed between the pair of guide channels proximate to the first end, the first scissor lever mechanism connected to the first shield, the first scissor lever mechanism configured to extend along the pair of guide channels so as to support travel of the first shield along the pair of guide channels to cover the first portion of the opening. The deployable containment system may also include a second scissor lever mechanism disposed between the pair of guide channels proximate to the second end, the second scissor lever mechanism connected to the second shield, the second scissor lever mechanism configured to extend along the pair of guide channels so as to support travel of the second shield along the pair of guide channels to cover the second portion of the opening. The deployable containment system where: the first actuator includes a spring to deploy the first shield from the first housing, and the second actuator includes a spring to deploy the second shield from the second housing. The deployable containment system where: the first actuator includes pyrotechnics to deploy the first shield from the first housing, and the second actuator includes pyrotechnics to deploy the second shield from the second housing. The deployable containment system where the deployment event is an indication that the vehicle rollover sensing system predicted a rollover event. The deployable containment system where: the first shield is a plurality of flap sections that overlap while in the first housing and, upon deployment, travel along the pair of guide channels so as to spread out in a shingled manner to cover the first portion of the opening, and the second shield is a plurality of flap sections that overlap while in the second housing and, upon deployment, travel along the pair of guide channels so as to spread out in a shingled manner to cover the second portion of the opening. The deployable containment system where: the first shield is folded in a Z-type configuration while in the first housing and, upon deployment, the first shield folds travel along the pair of guide channels so as to spread out in a planar manner to cover the first portion of the opening, and the second shield is folded in a Z-type configuration while in the second housing and, upon deployment, the second shield folds travel along the pair of guide channels so as to spread out in a planar manner to cover the second portion of the opening. The deployable containment system where: the first shield is wound into a roll shape around a first winding shaft while in the first housing and, upon deployment, the first shield is drawn from the winding shaft to travel along the pair of guide channels so as to cover the first portion of the opening, and the second shield is wound into a roll shape around a second winding shaft while in the second housing and, upon deployment, the second shield is drawn from the second winding shaft to travel along the pair of guide channels so as to cover the second portion of the opening.

One general aspect includes a method to deploy a containment system of a vehicle, the method including: providing a vehicle having a RollOver sensor (ROS), the ROS configured to sense when the vehicle is potentially in a rollover event; providing a controller located in the vehicle, the controller configured to determine that the vehicle is in the rollover event and transmit a deployment command; providing a deployable containment system installed onto a roof panel of the vehicle, where the containment system includes: a pair of guide channels disposed in parallel and proximate to an opening through the vehicle roof panel, each guide channel of the pair having a first end and a second end; a first housing mounted to the first end of the pair of guide channels, a second housing mounted to the second end of the pair of guide channels, a first shield configured to deploy from the first housing and travel along the pair of guide channels so as to cover a first portion of the opening; a second shield configured to deploy from the second housing and travel along the pair of guide channels so as to cover a second portion of the opening; a first actuator disposed proximate to the first end of the pair of guide channels, the first actuator configured to deploy the first shield from the first housing after a rollover event; a second actuator disposed proximate to the second end of the pair of guide channels, the second actuator configured to deploy the second shield from the second housing after the rollover event; sensing, via the ROS, that the vehicle is potentially in the rollover event; transmitting, via the ROS, rollover information to the controller; determining, via the controller, that the vehicle is in the rollover event; transmitting, via the controller, a deployment command to the first actuator and the second actuator; deploying, via the first actuator, the first shield from the first housing after the rollover event is detected; allowing the first shield to travel along the pair of guide channels to cover the first portion of the opening; deploying, via the second actuator, the second shield from the second housing after the rollover event is detected; and allowing the second shield to travel along the pair of guide channels to cover the second portion of the opening. Other embodiments of this aspect include corresponding computer systems, apparatus, and computer programs recorded on one or more computer storage devices, each configured to perform the actions of the methods.

Implementations may include one or more of the following features. The method further includes: providing one or more locking mechanisms configured to lock the first and second shields after each of the first and second shields has traveled a distance along the pair of guide channels; and locking, via the one or more locking mechanisms, the first and second shields after each of the first and second shields has traveled a distance along the pair of guide channels. The method where at least one of the one or more locking mechanisms includes an inflatable tube, inflator device, and anchor point. The method where: the first actuator includes a spring to deploy the first shield from the first housing, and the second actuator includes a spring to deploy the second shield from the second housing. The method where: the first actuator includes pyrotechnics to deploy the first shield from the first housing, and the second actuator includes pyrotechnics to deploy the second shield from the second housing. The method where: the first shield is wound into a roll shape around a first winding shaft while in the first housing and, after the step of deploying the first shield, the first shield is drawn from the winding shaft to travel along the pair of guide channels so as to cover the first portion of the opening, and the second shield is wound into a roll shape around a second winding shaft while in the second housing and, after the step of deploying the second shield, the second shield is drawn from the second winding shaft to travel along the pair of guide channels so as to cover the second portion of the opening. The method where: the first shield is folded in a Z-type configuration while in the first housing and, after the step of deploying the first shield, the first shield folds travel along the pair of guide channels so as to spread out in a planar manner to cover the first portion of the opening, and the second shield is folded in a Z-type configuration while in the second housing and, after the step of deploying the second shield, the second shield folds travel along the pair of guide channels so as to spread out in a planar manner to cover the second portion of the opening.

The above features and advantages and other features and advantages of the present teachings are readily apparent from the following detailed description for carrying out the teachings when taken in connection with the accompanying drawings.

BRIEF DESCRIPTION OF THE DRAWINGS

FIG. 5B shows a perspective view of an exemplary actuator according to one aspect;

FIG. 6A shows a perspective view of another exemplary containment system according to one aspect;

FIG. 6B shows a perspective view of an exemplary actuator according to one aspect;

FIG. 7A shows a perspective view of another exemplary containment system according to one aspect;

FIG. 7B shows a perspective view of an exemplary shield according to one aspect;

FIG. 8A shows a perspective view of another exemplary containment system according to one aspect;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
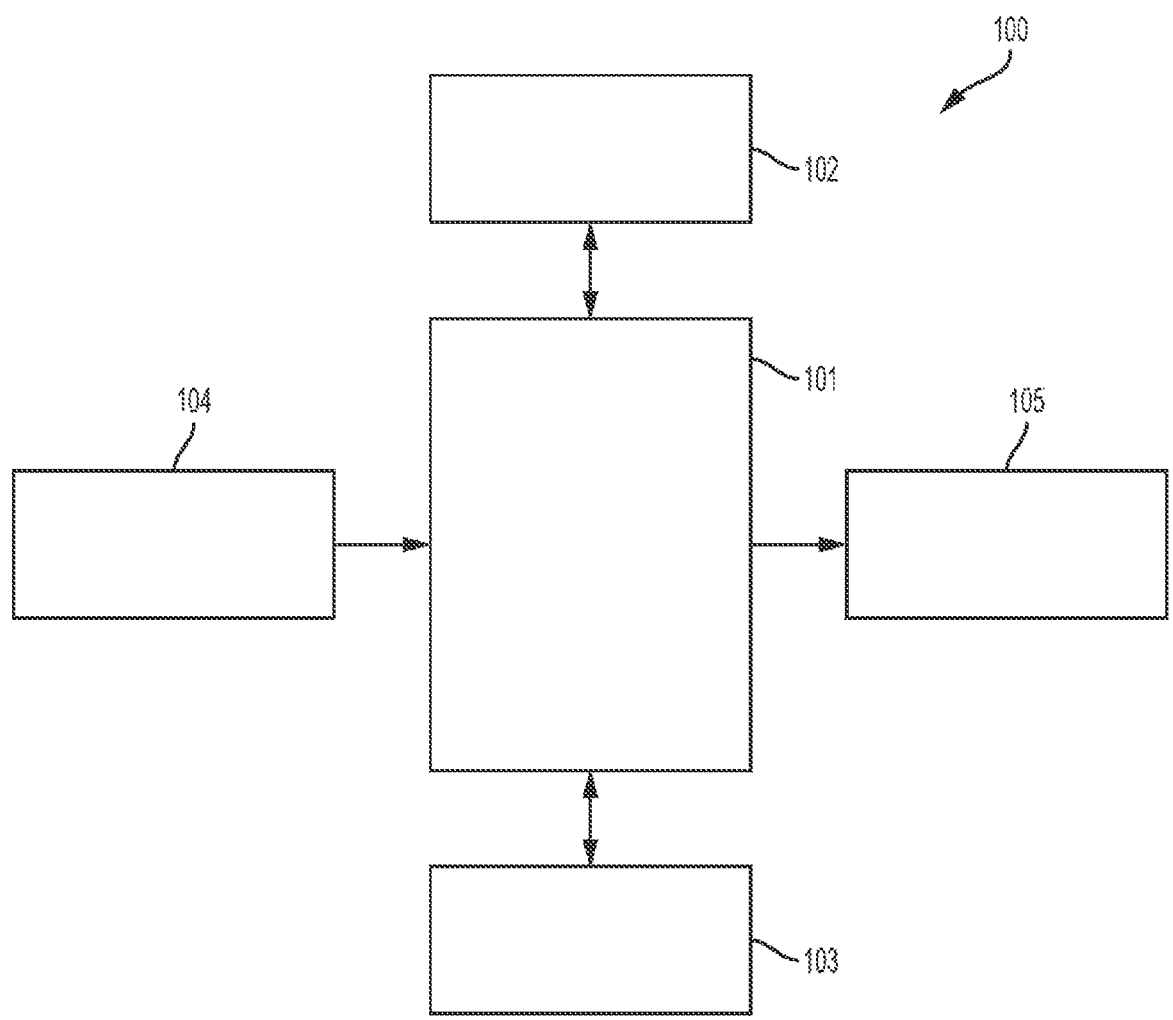
FIG. 1 shows an exemplary block diagram of an exemplary embodiment of a system to deploy a roof containment system.

Referring to the drawings in detail, and specifically to FIG. 1, a block diagram of an exemplary system to deploy a containment system on a roof panel of a vehicle 10 is generally indicated by reference numeral 100. As shown, the disclosed system 100 may be located within a vehicle (e.g., an automobile, truck, boat, airplane, etc.) and includes a controller 101, a power supply 102, a memory 103, Roll-Over Sensor (ROS) 104, and a containment system 105. In certain embodiments, system 100 may further include a communication device such as, but not limited to, an antenna system (not shown). However, system 100 is not limited to the aforementioned configuration and may be configured to include additional elements and/or omit one or more of the aforementioned elements.

Controller 101 essentially controls the overall operation and function of system 100. Upon reading and executing one or more executable instructions, controller 101 may control, send, and/or receive information from one or more of memory 103, ROS 104, and containment system 105 of system 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

Power supply 102 provides power to one or more of the controller 101, memory 103, ROS 104, and containment system 105. The power supply 102 may include one or more from a battery, an outlet, a capacitor, a solar energy cell, a generator, a wind energy device, an alternator, etc.

Memory 103 is configured for recording information, storing information, and retrieving information used by system 100. Memory 103 may include the executable instructions configured to be read and executed by controller 101 so as to perform the functions of system 100.

Memory 103 may include one or more from among optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

Figure 2A:
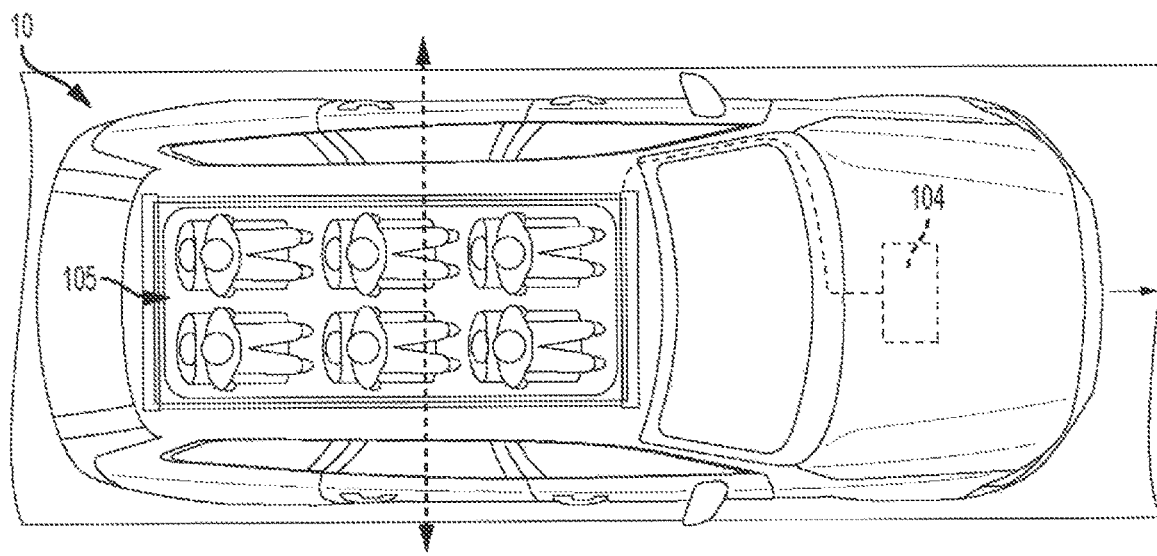
FIG. 2A shows a top-down environmental view of a vehicle in motion.
Figure 2B:
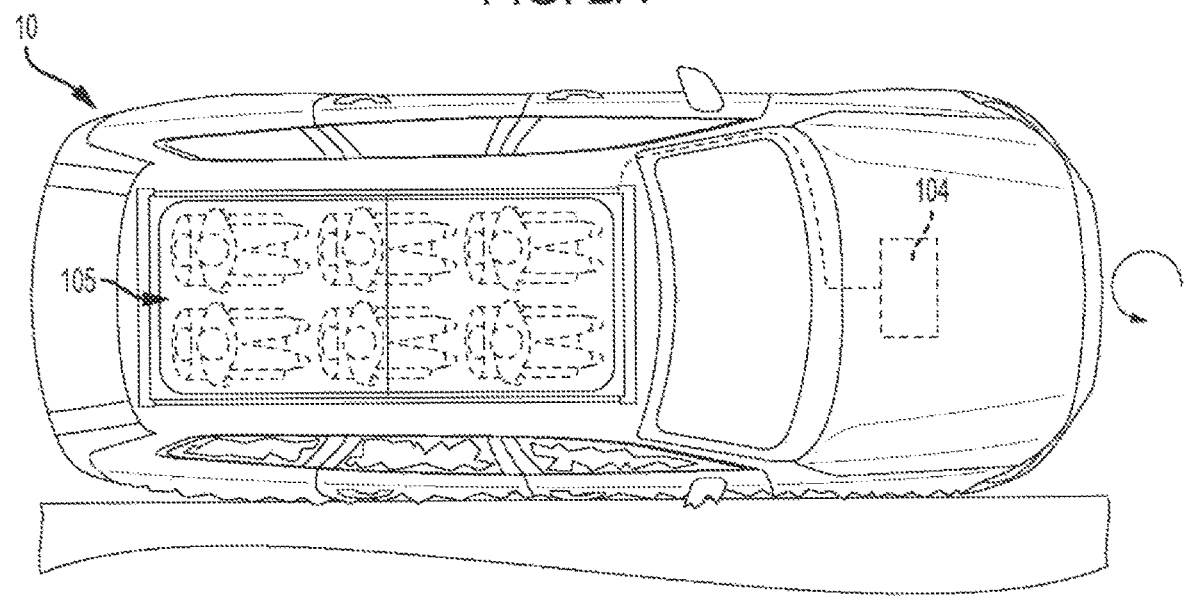
FIG. 2B shows a side view of a vehicle during a rollover event.
Figure 2C:
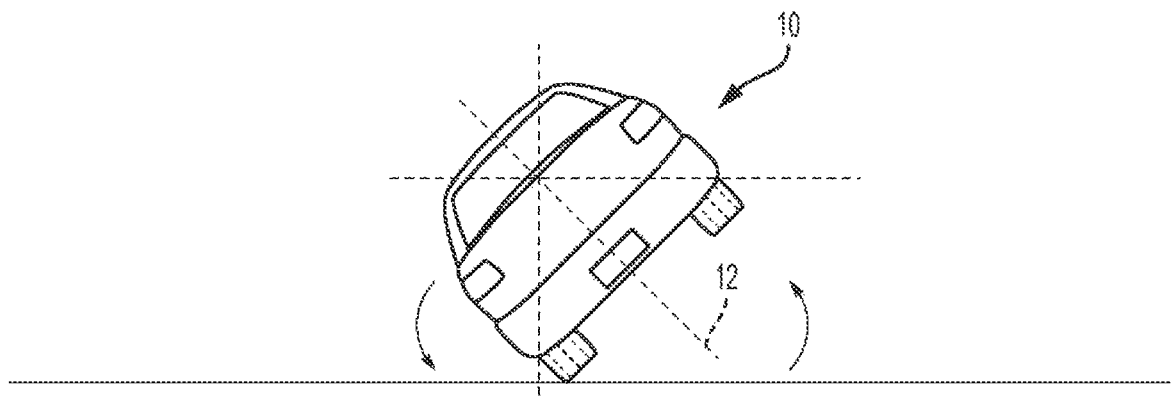
FIG. 2C shows a back-end view of a vehicle during a rollover event.

As represented by FIGS. 2A through 2C, the ROS 104 may be one or more sensors in the form of an electronic hardware component connected with at least one of the vehicle dynamics systems (e.g., the Sensing and Diagnostic Module (SDM), airbag control module (ACM), the vehicle's suspension system, stability system, etc.) and may be located throughout the vehicle. ROS 104 is configured to sense for certain changes occurring when vehicle 10 encounters a rollover event (i.e., when the vehicle 10 tilts 45 degrees beyond its horizontal axis/center of gravity—as represented by 12—and without any indication it will fall back onto all four wheels). As is generally known, for example, ROS 104 can detect values such as, but not limited to, vehicle yaw rate, roll rate, acceleration, speed, and sideslip angle to predict an impending vehicle rollover. When an impeding rollover is predicted, the ROS 104 will send a rollover event signal to controller 101.

Figure 3:
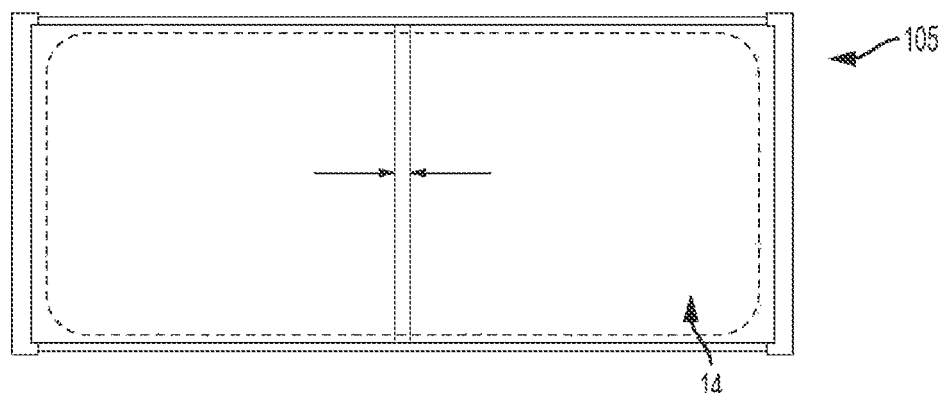
FIG. 3 shows a top-down view of an exemplary containment system according to one aspect.

Referring back to FIG. 1, according to an exemplary aspect, controller 101 is configured to receive the rollover event signal from ROS 104 and subsequently communicate a deployment signal to the containment system 105. As shown in FIG. 3, in one embodiment, the deployment signal causes two shields to rapidly close an opening 14 through the vehicle's roof panel (e.g., sunroof, moon roof, etc.). As such, system 100 provides a countermeasure to prevent occupant ejection through the opening 14 as well as prevent objects (e.g., road debris) from entering into the vehicle cabin. Controller 101 may be further configured to collaborate with memory 103 and/or the communication device to send a remote party communications comprising the developed topographical data. It should be understood this embodiment of containment system 105 discloses the shields closing lengthwise, from the front and aft of vehicle 10. However, it should be understood that containment system 105 may be configured to cause the shields to close crosswise, from both sides of vehicle 10.

As shown in FIGS. 4A through 4D, an exemplary embodiment of containment system 105 includes a pair of identical Deployable Roof Containment System (DRCS) modules 16 located at opposite ends of a pair of parallel guide channels 18 (i.e., a first and second end of the channels) that are installed on opposite sides of opening 14. As such, each module 16 includes a housing 20 with a shield 22 located therein. Each housing 20 may be installed onto the interior side (e.g., beneath upholstery) of the vehicle 10 roof panel or may be installed on the exterior of the vehicle 10. Moreover, each housing 20 maybe constructed of a rigid material such as, but not limited to, plastic, metal, or fiberglass.

Each shield 22 is configured to deploy from its respective housing 20 and is operatively connected to an actuator 24 through a pin 26. As a result, after the implementation of actuator 24, the shields 22 can deploy from their respective housing 20 and travel along the guide channels in a lateral direction 28, until they meet in the middle of the guide channels 18 and fully block off opening 14. In this embodiment, with additional reference to FIG. 4B, shields 22 may be made of a flexible material (e.g., plastic, fabric, Teflon, etc.) and may be wound into a roll shape around a winding shaft 30 located centrally within housing 20. As such, upon being deployed from housing 20, shields 22 are drawn from the rotating winding shafts 30 and can travel laterally via the guide channels 18.

Figure 4A:
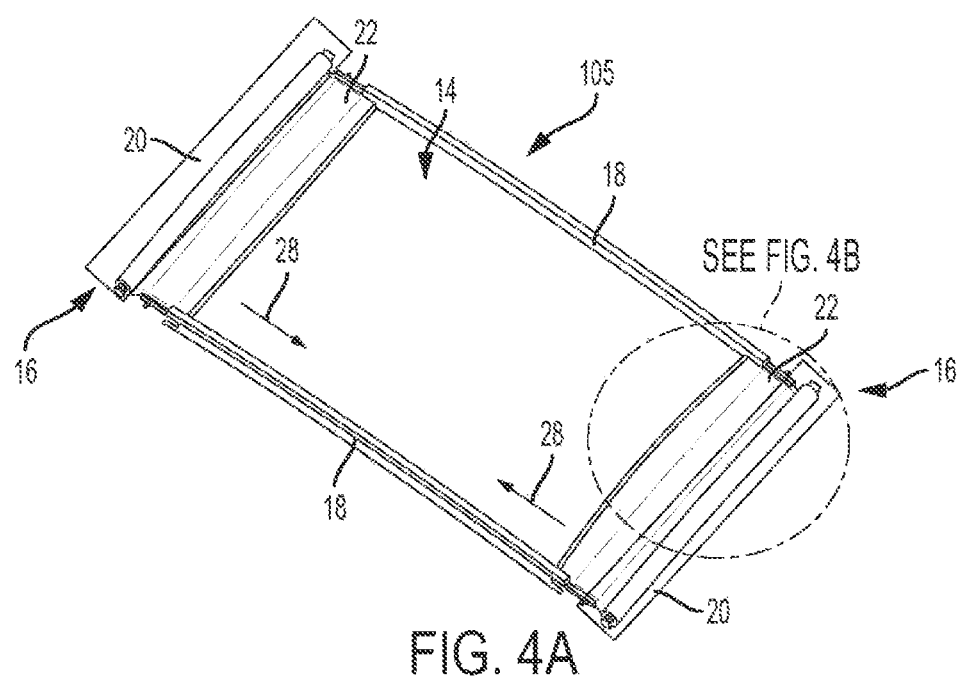
FIG. 4A shows a perspective view of another exemplary containment system according to one aspect.
Figure 4B:
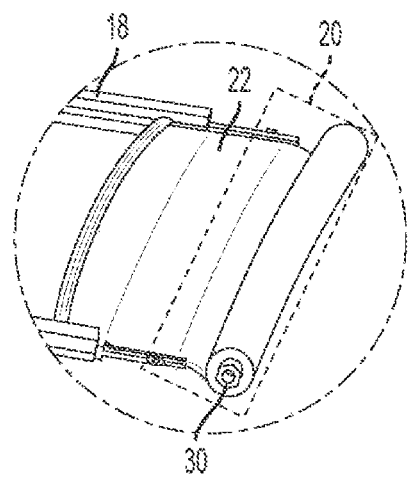
FIG. 4B shows a perspective view of an exemplary containment system module according to one aspect.
Figure 4C:
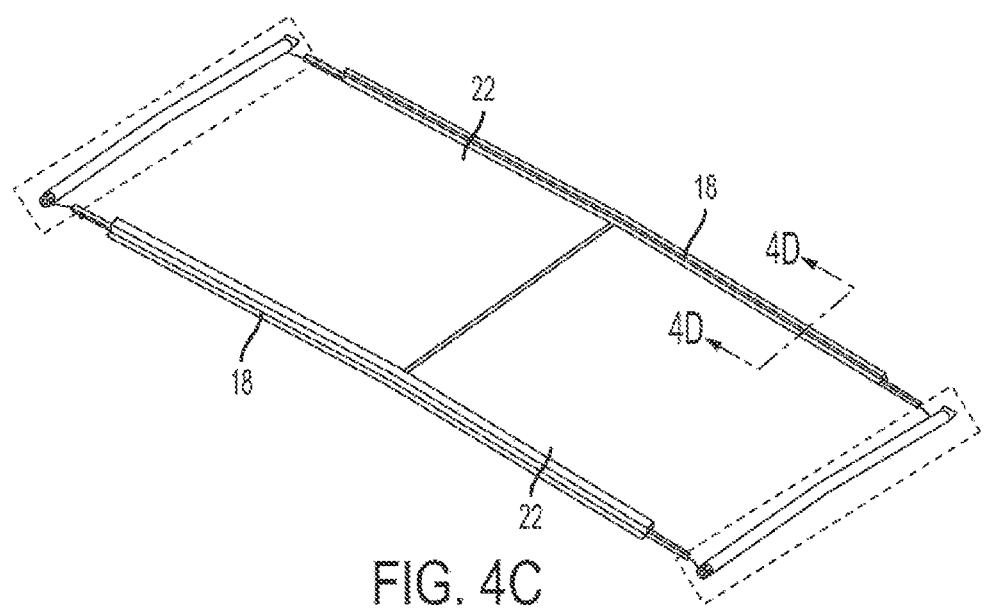
FIG. 4C shows a perspective view of the exemplary containment system of FIG. 4A according to another aspect.
Figure 4D:
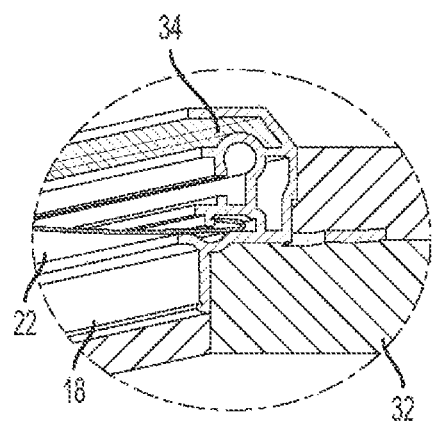
FIG. 4D shows a perspective cross-sectional view of an exemplary guide channel of the exemplary containment system of FIG. 4C according to one aspect.

With additional reference to FIG. 4D, the guide channels 18 can be installed at the edges of roof panel 32 that define the opening 14. As shown, each guide channel 18 may be tiered such that a pane of glass 34 is installed above the channel in which shields 22 travel. This configuration ensures that the glass 34 will be restricted from traveling into the vehicle interior after deployment of the shields 22.

Figure 5A:
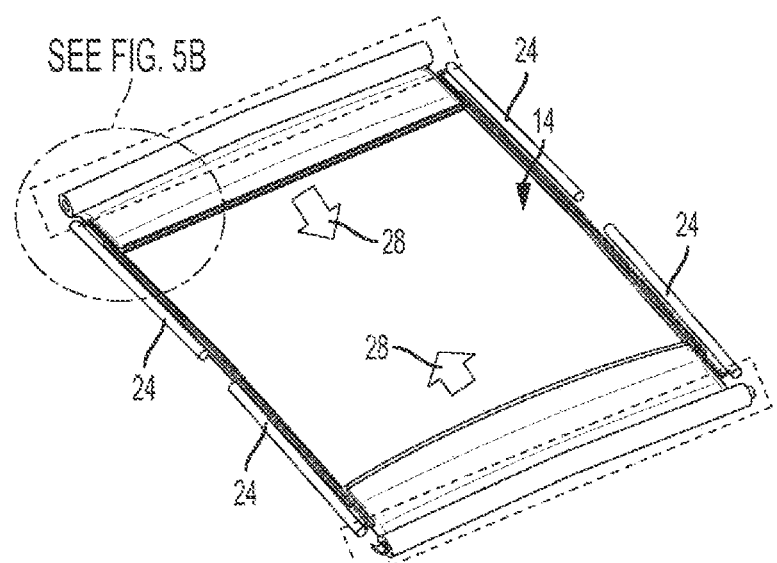
FIG. 5A shows a perspective view of another exemplary containment system according to one aspect.

As shown in FIGS. 5A and 5B, containment system 105 includes four identical actuators 24, each being in proximity from the external sides of guide channels 18 (e.g., approximately an inch) and at one of the channel ends. As such, the installed actuators 24 are oriented to substantially surround opening 14. The actuators 24 are also connected to controller 101 (e.g., via a vehicle bus), which can command their activation, and thus deployment of the shields 22, when the vehicle 10 is going through a rollover event. In this embodiment, the actuators 24 will implement pyrotechnics to deploy the shields 22 from their corresponding housing 20. For example, each actuator 24 may include an elongated tube with propulsion component located therein (e.g., inflammable gas)—as is generally known. As follows, when an activation command is sent from controller 101 (e.g., an electric signal), the propulsion component will ignite to fire a small explosive charge and create pressure to shear the pin 26 away and cause it to move laterally along the length of the tube (which will in turn cause the corresponding shield 22 to move laterally along the guide channels 18). This variety of pyrotechnic actuator can be considered in a normally-closed (NC) configuration.

As shown in FIGS. 6A and 6B, in another embodiment, each actuator 24' may incorporate a housed spring 36 to deploy the shields 22 from their corresponding housing 20. For example, each actuator 24' may release spring 36 upon a deployment command and allow the spring 36 to shear the pin 26 away and cause it to move laterally along the length of the tube and thus the corresponding guide channel 18 (similar to the previous embodiment).

Figure 8B:
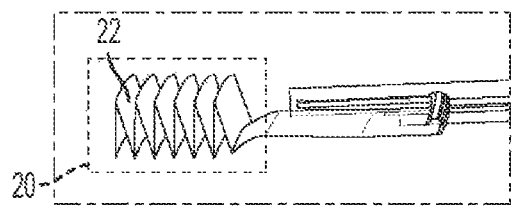
FIG. 8B shows a side view of an exemplary shield according to one aspect.
Figure 9:
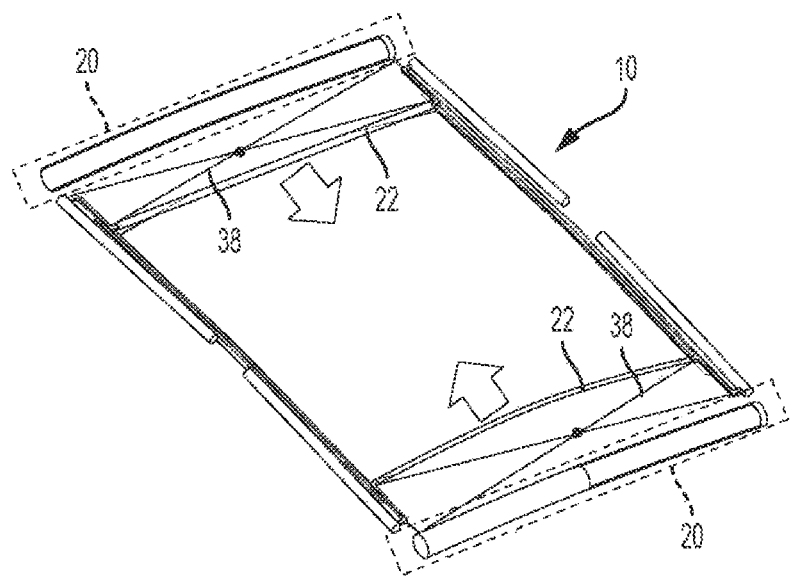
FIG. 9 shows a perspective view of another exemplary containment system according to one aspect.

As shown in FIGS. 7A and 7B, the shields 22 may be embodied to have a shingled flaps configuration. As a result, each shield 22 is a composition of numerous rectangular flap sections which overlap while within housing 20. Moreover, upon deployment, the flaps will each be moved laterally along the guide channels 18 to spread apart into a shingled manner (i.e., in which a minority portion of each flap overlaps an adjacent flap), until the shields 22 fully cover opening 14. As shown in FIGS. 8A and 8B, the shields 22 may be embodied to be folded into a Z-type configuration while within housing 20. As such, the shield 22 has a zig-zag look where the shield is sectionally folded into flaps while within housing 20. Moreover, upon deployment, the folds will be drawn out laterally along the guide channels 18 to spread out flat in a planar manner, until the shields 22 fully cover opening 14. As shown in FIG. 9, containment system 105 may include a scissor lever mechanism 38 (toggle type) that is connected to housing 20 and shield 22 (e.g., via pin 26). The scissor lever 38 helps stabilize shield 22 while traveling along guide channels 18. Scissor lever 38 also supports smooth travel for shield 22 along and helps prevent jamming during such travel. For example, scissor lever 38 may be constructed from linked, folding support beams having a criss-cross 'X' pattern. Skilled artisans will readily understand the various configurations and componentry of toggle-type scissor lever mechanisms, as they are known in this field.

Figure 10:
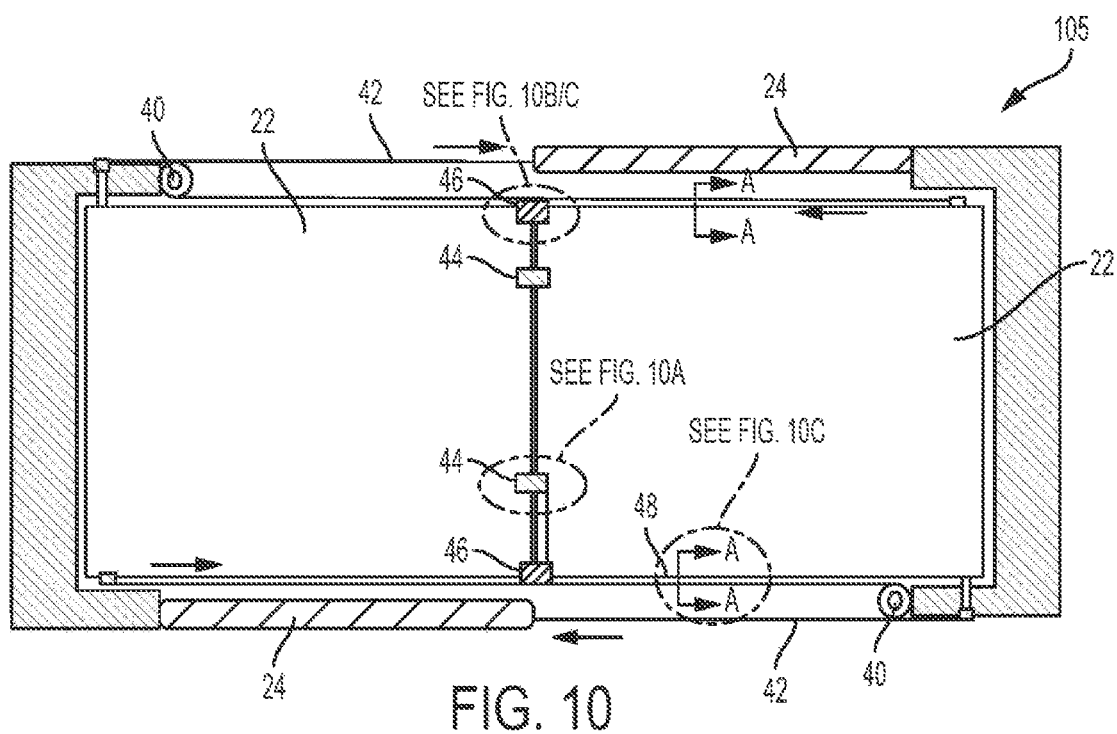
FIG. 10 shows a top-down view of another exemplary containment system according to one aspect.
Figures 10A, 10B, 10C:
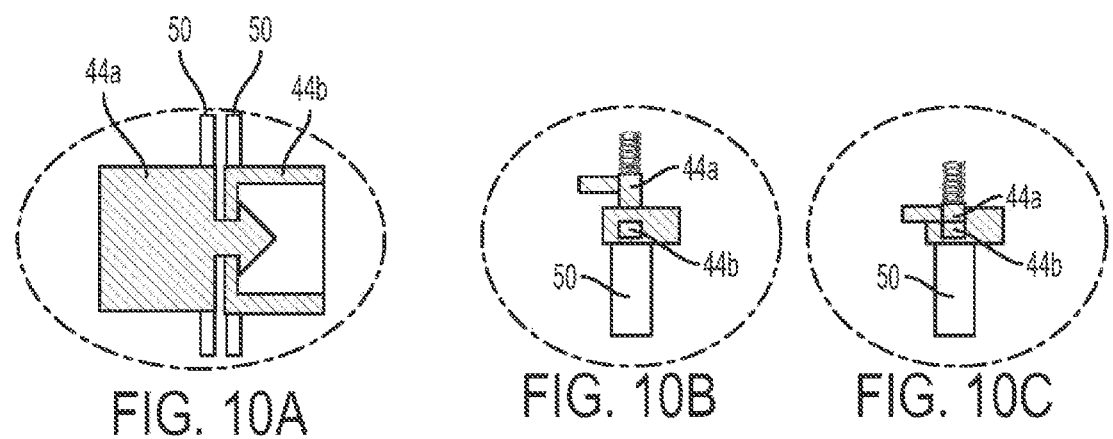
FIG. 10A shows a top-down view of an exemplary locking mechanism according to one aspect.
FIG. 10B shows a top-down view of another exemplary locking mechanism according to one aspect.
FIG. 10C shows a top-down view of the exemplary locking mechanism of FIG. 10B according to another aspect.
Figure 10D:
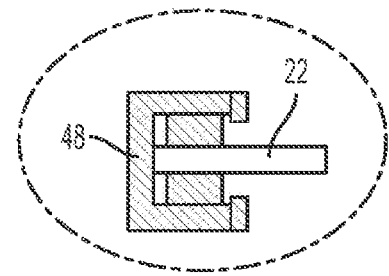
FIG. 10D shows a top-down view of another exemplary locking mechanism according to one aspect.

As shown in FIG. 10, an embodiment of containment system 105 can incorporate a pulleys 40 to assist in the deployment of the shields 22. As such, each actuator 24 will be configured to pull on a corresponding line 42 that is wrapped around one of the pulleys 40 to cause deployment of one of the shields 22. In this embodiment, it should be understood the actuator may be considered to have a normally-open (NO) configuration. With reference to FIGS. 10A through 10D, containment system 105 may include one or more types of locking mechanisms 44, 46, 48 to lock the shields 22 together after meeting with each other in the middle of the guide channels 18 and restrict the shields 22 from further movement. These locking mechanisms 44, 46, 48 system may be disposed in the guide channels 18, along the ends of the shields 22, or at the location where the shields 22 meet. As such, the locking mechanisms 44, 46, 48 will lock the shields 22 together after they have met in the middle. For example, locking mechanism 44 may be embodied as a snap locking system in which a male snap locking tab 44a inserts into and interlocks with a female snap locking tab 44b. In another example, locking mechanism 46 may be embodied as a system having a spring biased lock pin 46a, located on the sides of the guide channels 18, that insertably interlocks into a notch 46b that is located on the sides of the end edges of each shield 22. It should be understood that each guide post may include two spring biased lock pins 46a to insert into a correspond notch 46b to accomplish this effect. Moreover, to support locking mechanisms 44 and 46, the end edges of each shield 22 may be hemmed with sheet metal rods 50 for stiffness purposes. In another example, locking mechanism 48 may be embodied as a structural guide member long the body of each guide channel 48. As such, operating in a similar manner as a seatbelt pretensioner, the structural guide member restricts each shield 22 from moving in a reverse lateral direction after traveling along the guide channels in a lateral direction 28.

Figure 11A:
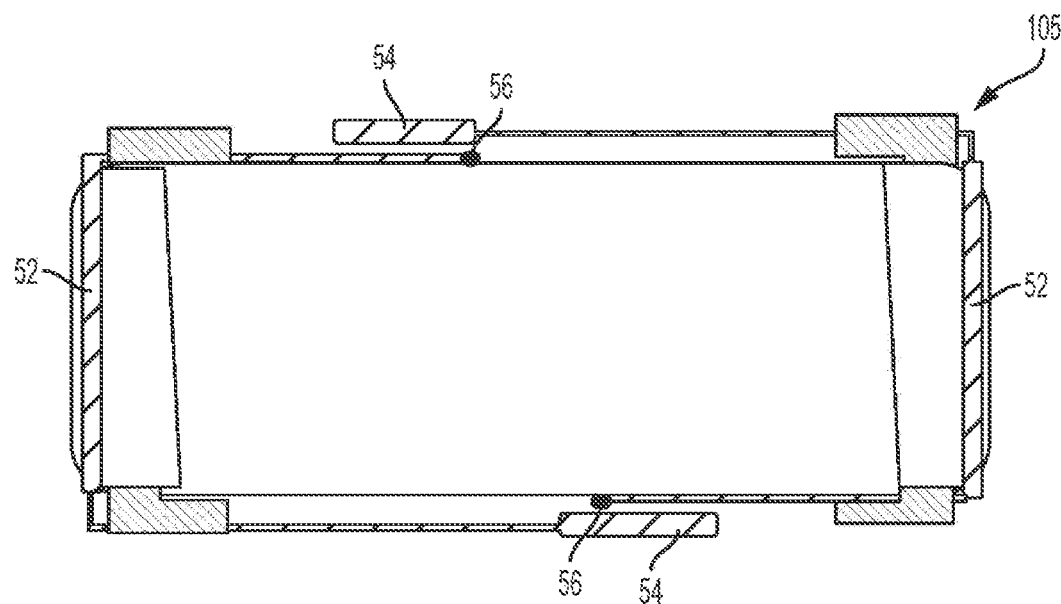
FIG. 11A shows a top-down view of another exemplary containment system according to one aspect.
Figure 11B:
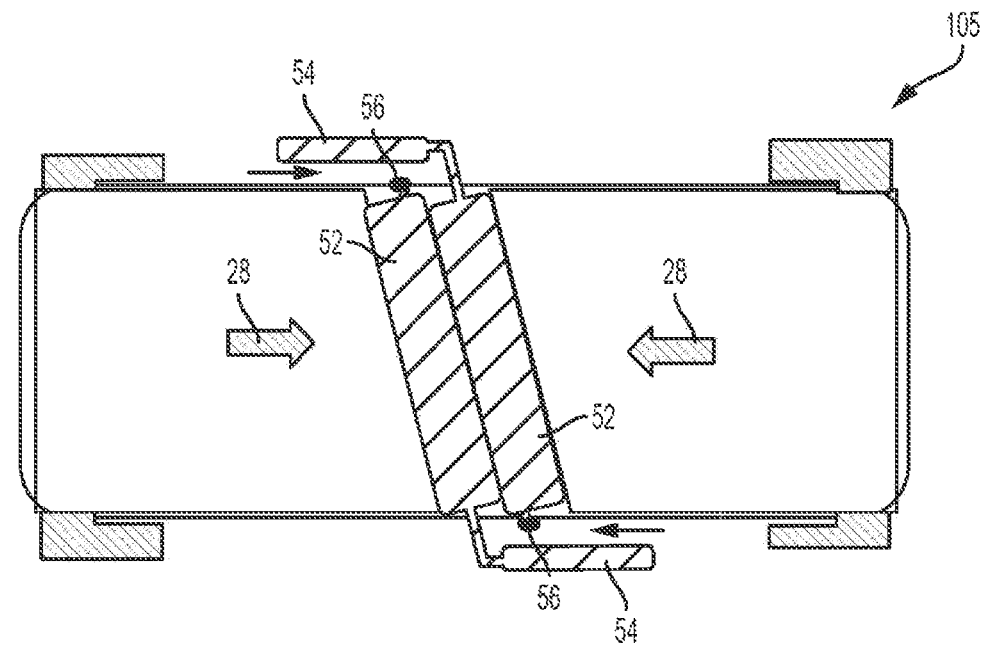
FIG. 11B shows a top-down view of the containment system of FIG. 11A according to another aspect.
Figure 12A:
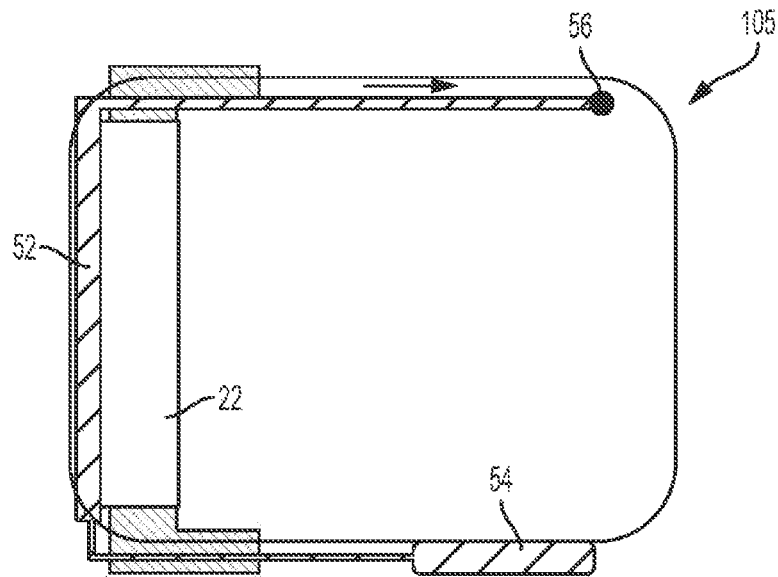
FIG. 12A shows a top-down view of another exemplary containment system according to one aspect.
Figure 12B:
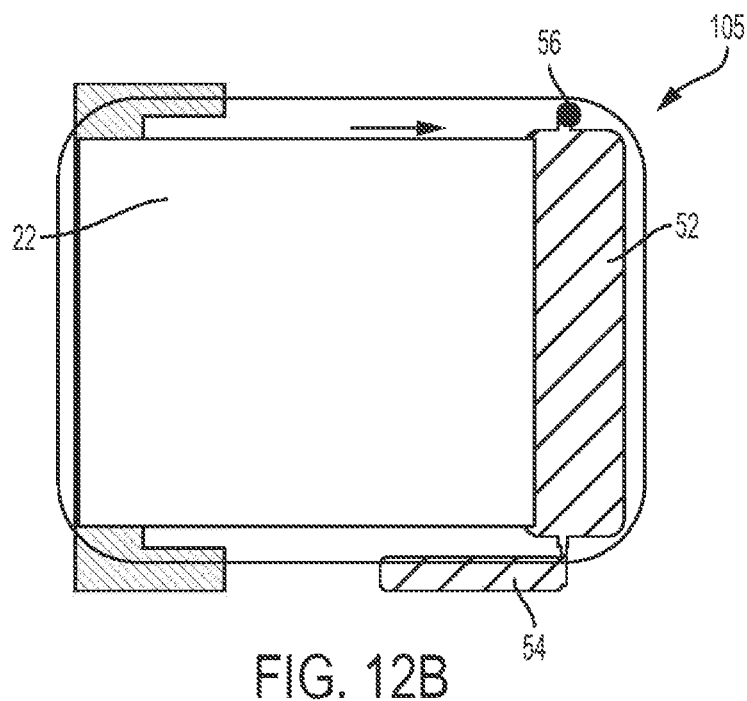
FIG. 12B shows a top-down view of the containment system of FIG. 12A according to another aspect.

As shown in FIGS. 11A and 11B, an embodiment of containment system 105 can incorporate a locking mechanism system embodied as a pair of inflatable tubes 52 operatively connected to a pair of inflator devices 54 and anchor points 56. As such, after traveling their respective length along the guide channels, the inflator devices 54 may activate to inject gas into the inflatable tubes 52. The inflatable tubes 52 will fill with the gas and expand until locking into position via the anchor points 56, so as to completely block of a gap between the ends of each shield 22. An embodiment of containment system 105 incorporating a single shield 22 to cover opening 14 and a single inflatable tube locking mechanism system 52 is shown in FIGS. 12A and 12B. This version of containment system 105 operates in substantially the same manner as those having two shields 22; however, as shown, the single shield section 22 (and inflatable tube 52) covers substantially all of the opening 14.

Figure 13:
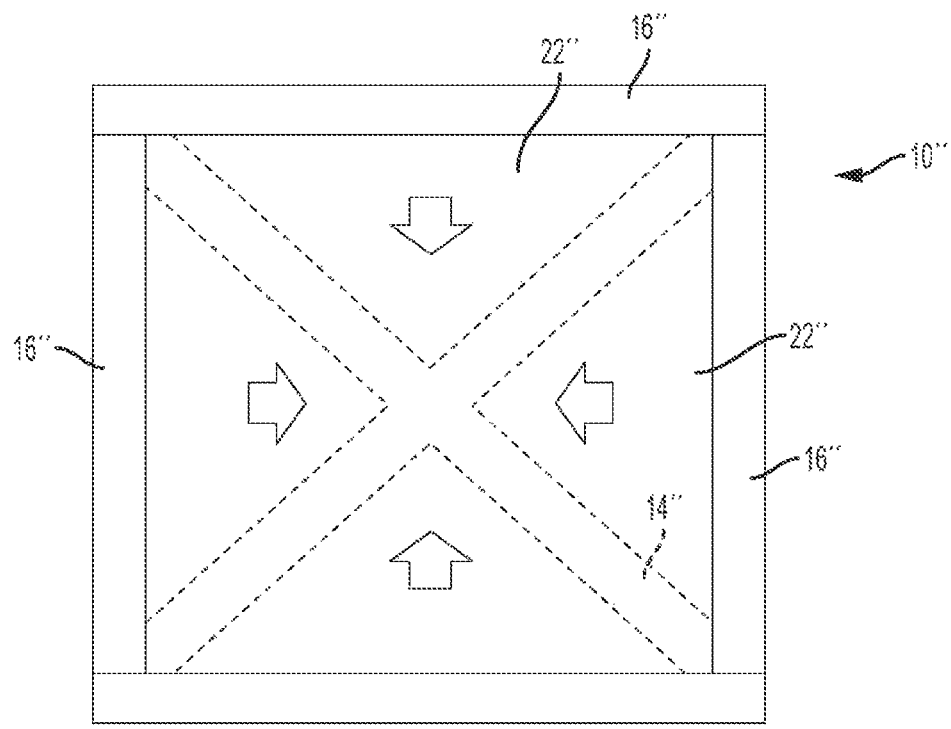
FIG. 13 shows a top-down view of another exemplary containment system according to one aspect.
Figure 14:
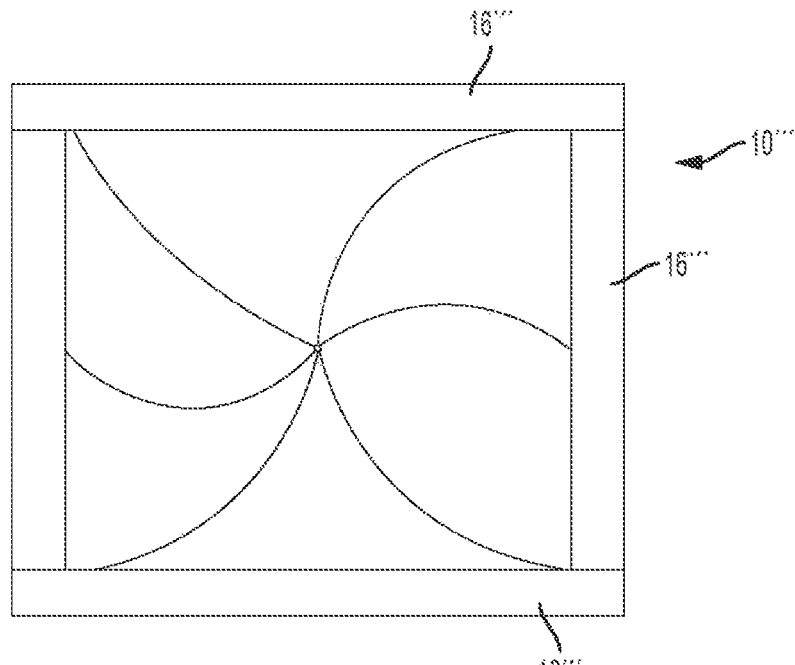
FIG. 14 shows a top-down view of another exemplary containment system according to one aspect.

As shown in FIG. 13, containment system 10" may include an alternative configuration in which four shield 22" sections meet to close opening 14". It should be understood, to accomplish this effect, system 10" may implement two sets of guide channels 18" and two sets of modules 16", with the sets being positioned to form a square shape (as shown). As shown in FIG. 14, containment system 10''' may include an alternative fan-like configuration in which six shield 22''' sections meet to close opening. It should be understood, to accomplish this effect, system 10''' may implement multiple sets of guide channels 14''' and multiple sets of modules 16''', with the sets being positioned to form the shields 22 into a fan shape (as shown).

Figure 15:
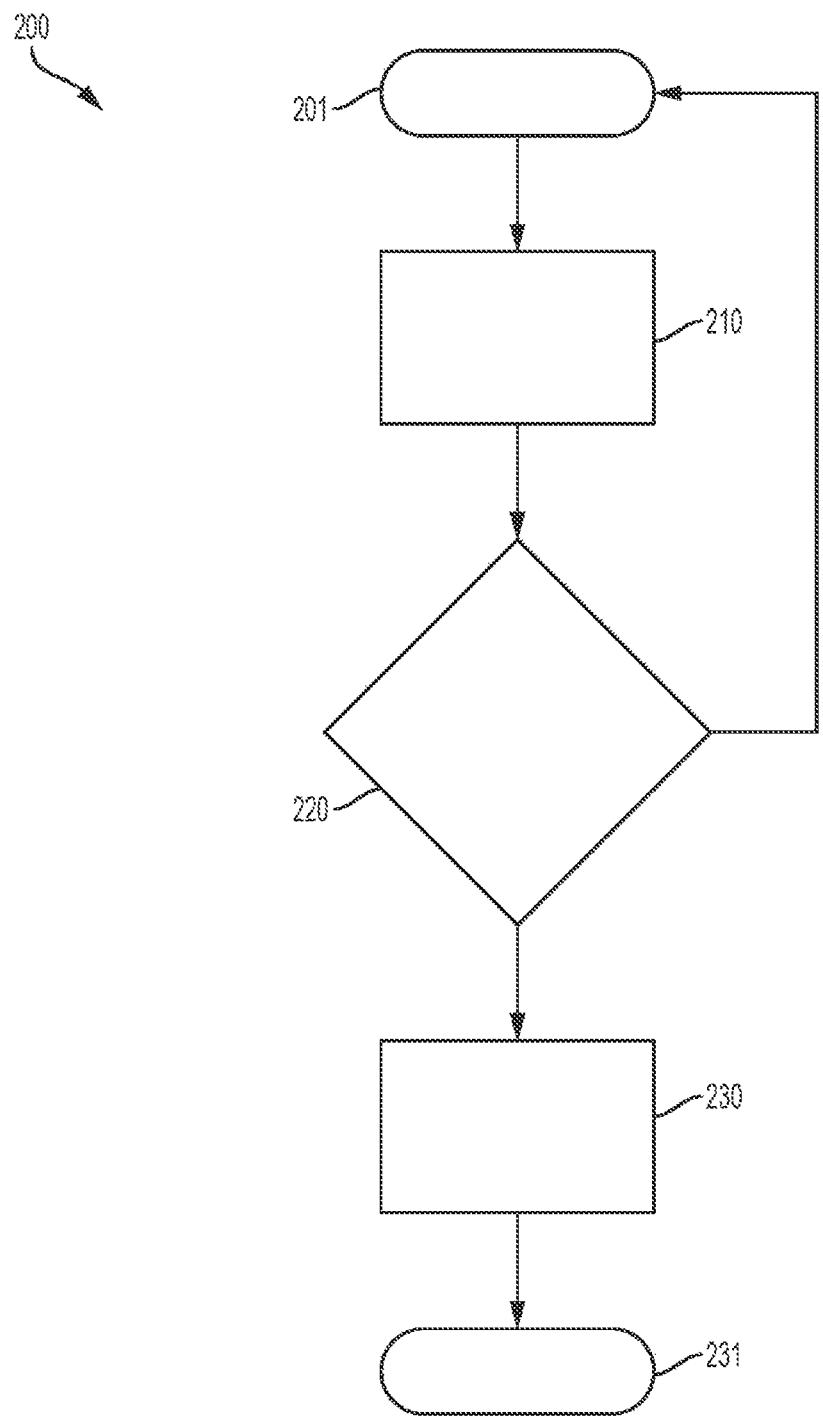
FIG. 15 is a flow chart depicting an embodiment of a method to deploy a containment system of a vehicle.

Referring now to FIG. 15, a method 200 for deploying containment system begins with the vehicle in an operational mode being referred to as 201. In step 210, ROS 104 senses the vehicle 10 is potentially experiencing a rollover event. As discussed above, a rollover event may be one in which, the vehicle 10 has tilted past 45 degrees beyond its horizontal axis (center of gravity) and without any indication the vehicle will reverse tilt back onto all four wheels (FIG. 2C). In this step, ROS 104 will also transmit the rollover information to controller 101. In step 220, controller 101 determines whether vehicle 10 is actually experiencing a rollover event, and is thus fully rolling over (without any indication of the vehicle returning to its normal orientation). If it is determined that vehicle 12 is not experiencing a rollover event (the vehicle will reverse its tilt and return to its normal four wheel orientation), method 200 will return to considering the vehicle 12 being in its normal mode of operation 201; otherwise, method 200 will move to step 230. In step 230, controller 101 will send a deployment command signal to containment system 105. In this step, for example, as discussed above, each actuator 24 will collaborate to deploy the shields 22 and the shields 22 will in turn travel along the guide channels 18 to cover opening 14 (i.e., a deployment event). As discussed above, in certain embodiments, a locking mechanism may be incorporated to lock the shields 22 in place after they block opening 14.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for" in the claim.

What is claimed is:

1. A method to deploy a containment system of a vehicle, the method comprising:
   providing a vehicle having a RollOver Sensor (ROS), the ROS configured to sense when the vehicle is potentially in a rollover event;
   providing a controller located in the vehicle, the controller configured to determine that the vehicle is in the rollover event and transmit a deployment command;
   providing a deployable containment system installed onto a roof panel of the vehicle, wherein the containment system comprises:
   a pair of guide channels installed along two parallel edges of an opening through the vehicle roof panel, each guide channel of the pair having a first end and a second end;
   a first housing mounted to the first end of the pair of guide channels;
   a second housing mounted to the second end of the pair of guide channels;
   a first shield configured to deploy from the first housing and travel along the pair of guide channels so as to cover a first portion of the opening;
   a second shield configured to deploy from the second housing and travel along the pair of guide channels so as to cover a second portion of the opening;
   a first actuator disposed in a substantially parallel relationship to both an external side of a corresponding guide channel of the pair and externally along a corresponding edge of the parallel edges of the opening, wherein a first end of the first actuator is in proximity to the first end of the corresponding guide channel of the pair and a second end of the first actuator is in proximity to a point along the external side of the corresponding guide channel of the pair, wherein the first actuator is located outside the perimeter of the opening, wherein a first end of the first shield is operatively connected to the first actuator via a first pin, and wherein the first actuator is configured to deploy the first shield from the first housing such that the first shield moves parallel to the elongated length of the first actuator after a deployment event; and a second actuator disposed in parallel to both an external side of a corresponding guide channel of the pair and externally along a corresponding edge of the parallel edges of the opening, wherein a first end of the second actuator is in proximity to the first end of the corresponding guide channel of the pair and a second end of the second actuator is in proximity to a point along the external side of the corresponding guide channel of the pair, wherein the second actuator is located outside the perimeter of the opening, wherein a first end of the second shield is operatively connected to the second actuator via a second pin, and wherein the second actuator is configured to deploy the second shield from the second housing such that the second shield moves parallel to the elongated length of the second actuator after a deployment event;

sensing, via the ROS, that the vehicle is potentially in the rollover event;

transmitting, via the ROS, rollover information to the controller determining, via the controller, that the vehicle is in the rollover event;

transmitting, via the controller, a deployment command to the first actuator and the second actuator;

deploying, via the first actuator, the first shield from the first housing after the rollover event is detected;

allowing the first shield to travel along the pair of guide channels to cover the first portion of the opening;

deploying, via the second actuator, the second shield from the second housing after the rollover event is detected; and allowing the second shield to travel along the pair of guide channels to cover the second portion of the opening.

2. The method of claim 1, further comprising:
providing one or more locking mechanisms configured to lock the first and second shields after each of the first and second shields has traveled a distance along the pair of guide channels; and locking, via the one or more locking mechanisms, the first and second shields after each of the first and second shields has traveled a distance along the pair of guide channels.

3. The method of claim 2, wherein at least one of the one or more locking mechanisms comprises an inflatable tube, inflator device, and anchor point.

4. The method of claim 1, wherein:
the first actuator comprises a spring to deploy the first shield from the first housing; and
the second actuator comprises a spring to deploy the second shield from the second housing.

5. The method of claim 1, wherein:
the first actuator comprises pyrotechnics to deploy the first shield from the first housing; and
the second actuator comprises pyrotechnics to deploy the second shield from the second housing.

6. The method of claim 1, wherein:
the first shield is wound into a roll shape around a first winding shaft while in the first housing and, after the step of deploying the first shield, the first shield is drawn from the winding shaft to travel along the pair of guide channels so as to cover the first portion of the opening; and
the second shield is wound into a roll shape around a second winding shaft while in the second housing and, after the step of deploying the second shield, the second shield is drawn from the second winding shaft to travel along the pair of guide channels so as to cover the second portion of the opening.

7. The method of claim 1, wherein:
the first shield is folded in a Z-type configuration while in the first housing and, after the step of deploying the first shield, the first shield folds travel along the pair of guide channels so as to spread out in a planar manner to cover the first portion of the opening; and
the second shield is folded in a Z-type configuration while in the second housing and, after the step of deploying the second shield, the second shield folds travel along the pair of guide channels so as to spread out in a planar manner to cover the second portion of the opening.

8. The method of claim 1, wherein the first pin is configured to operatively connect the first end of the first shield to the first actuator such that, after the first shield is deployed from the first housing, the first end of the first shield will meet the first end of the second shield in the middle of the opening so as to fully block off the opening.

* * * * *